US012495261B2

(12) United States Patent
Boehm et al.

(10) Patent No.: US 12,495,261 B2
(45) **Date of Patent: *Dec. 9, 2025**

(54) METHOD AND APPARATUS FOR DECODING STEREO LOUDSPEAKER SIGNALS FROM A HIGHER-ORDER AMBISONICS AUDIO SIGNAL

(71) Applicant: DOLBY INTERNATIONAL AB, Dublin (IE)

(72) Inventors: Johannes Boehm, Göttingen (DE); Florian Keiler, Hannover (DE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,414

(22) Filed: May 10, 2024

(65) Prior Publication Data

US 2024/0373186 A1 Nov. 7, 2024

Related U.S. Application Data

(60) Continuation of application No. 17/521,762, filed on Nov. 8, 2021, now Pat. No. 12,010,501, which is a (Continued)

(30) Foreign Application Priority Data

Mar. 28, 2012 (EP) .................................... 12305356

(51) Int. Cl.
*H04S 3/00* (2006.01)
*G10L 19/00* (2013.01)

(Continued)

(52) U.S. Cl.
CPC .............. *H04S 3/008* (2013.01); *G10L 19/00* (2013.01); *H04S 1/002* (2013.01); *H04S 1/007* (2013.01);

(Continued)

(58) Field of Classification Search
None
See application file for complete search history.

(56) References Cited

U.S. PATENT DOCUMENTS 4,704,728 A 11/1987 Scheiber
7,231,054 B1 * 6/2007 Jot ............................ H04S 3/00 381/23

(Continued)

FOREIGN PATENT DOCUMENTS

CN 1647158 A 7/2005
CN 1864436 A 11/2006

(Continued)

OTHER PUBLICATIONS

Bamford, J. et al "Ambisonic Sound for Us" AES presented at the 99th Convention, Oct. 1995, New York, pp. 1-19.

(Continued)

*Primary Examiner* — Hemant S Patel

(57) ABSTRACT

Decoding of Ambisonics representations for a stereo loudspeaker setup is known for first-order Ambisonics audio signals. But such first-order Ambisonics approaches have either high negative side lobes or poor localisation in the frontal region. The invention deals with the processing for stereo decoders for higher-order Ambisonics HOA.

7 Claims, 3 Drawing Sheets

Related U.S. Application Data continuation of application No. 16/538,080, filed on Aug. 12, 2019, now Pat. No. 11,172,317, which is a division of application No. 15/876,404, filed on Jan. 22, 2018, now Pat. No. 10,433,090, which is a division of application No. 15/479,108, filed on Apr. 4, 2017, now Pat. No. 9,913,062, which is a continuation of application No. 14/386,784, filed as application No. PCT/EP2013/055792 on Mar. 20, 2013, now Pat. No. 9,666,195.

(51) Int. Cl.
*H04S 1/00* (2006.01)
*H04S 3/02* (2006.01)
*H04S 7/00* (2006.01)

(52) U.S. Cl.
CPC .................. *H04S 3/02* (2013.01); *H04S 7/30* (2013.01); *H04S 2400/01* (2013.01); *H04S 2400/11* (2013.01); *H04S 2420/11* (2013.01)

(56) References Cited

U.S. PATENT DOCUMENTS

| | | | | |
|---|---|---|---|---|
| 7,787,631 | B2 | 8/2010 | Faller | |
| 9,666,195 | B2 * | 5/2017 | Keiler | G10L 19/00 |
| 9,913,062 | B2 | 3/2018 | Keiler | |
| 10,433,090 | B2 | 10/2019 | Keiler | |
| 11,172,317 | B2 | 11/2021 | Boehm | |
| 2009/0067636 | A1 | 3/2009 | Faure et al. | |
| 2009/0092259 | A1 | 4/2009 | Jot | |
| 2010/0246831 | A1 | 9/2010 | Mahabub | |
| 2010/0284542 | A1 | 11/2010 | McGrath et al. | |
| 2010/0329466 | A1 | 12/2010 | Berge | |
| 2011/0208331 | A1 | 8/2011 | Sandler | |
| 2013/0010971 | A1 | 1/2013 | Batke | |
| 2014/0064494 | A1 | 3/2014 | Mahabub | |
| 2015/0070153 | A1 | 3/2015 | Bhatia | |

FOREIGN PATENT DOCUMENTS

| | | | |
|---|---|---|---|
| CN | 101212843 | A | 7/2008 |
| CN | 101263742 | B | 9/2008 |
| CN | 101341793 | A | 1/2009 |
| CN | 103250207 | A | 8/2013 |
| EP | 1690334 | A1 | 8/2006 |
| EP | 2094032 | A1 | 8/2009 |
| GB | 394325 | A | 6/1933 |
| JP | H05-103391 | A | 4/1993 |
| JP | H06-165281 | A | 6/1994 |
| JP | 2006-506918 | A | 2/2006 |
| JP | 2007-006474 | A | 1/2007 |
| JP | 2007-208709 | A | 8/2007 |
| JP | 2009-218655 | A | 9/2009 |
| JP | 2012049967 | A | 3/2012 |
| JP | 6622344 | B2 | 12/2019 |
| TW | 200822781 | A | 5/2008 |
| WO | 2010/019750 | A1 | 2/2010 |
| WO | 2011117399 | A1 | 9/2011 |
| WO | 2012/023864 | A1 | 2/2012 |

OTHER PUBLICATIONS

Batke, Johann-Markus et al "Using VBAP-Derived Panning Functions for 3D Ambisonics Decoding" Proc. of the 2nd International Symposium on Ambisonics and Spherical Acoustics, May 6-7, 2010, Paris, France, pp. 1-4.

Boehm, Johannes "Decoding for 3D" AES presented at the 130th Convention, May 13-16, 2011, London, UK, pp. 1-16.

Poletti, M.A. "Three-Dimensional Surround Sound Systems Based on Spherical Harmonics" J. Audio Eng. Society, vol. 53, pp. 1004-1025, Nov. 2005.

Poletti, Mark "Robust Two-Dimensional Surround Sound Reproduction for Nonuniform Loudspeaker Layouts" J. Audio Eng. Society, vol. 55, No. 7/8,, Jul./Aug. 2007, pp. 598-610.

Pulkki, Ville "Virtual Sound Source Positioning Using Vector Base Amplitude Panning" J. Audio Engineering Society, vol. 45, No. 6, Jun. 1997, pp. 456-466.

Weinzierl, Stefan "Handbuch der Audiotechnik" cf. section 3.3.4.1, Springer, Berlin 2008, pp. 107-110.

Williams, Earl G. "Fourier Acoustics" vol. 93 of Applied Mathematical Sciences, Academic Press, 1999, pp. 183-186, Chapter 6.

XiphWiki—Ambisonics, http://wiki.xiph.org/index.php/Ambisonics#Default.sub.--channel.sub.--con- versions.sub.--from.sub.--B-Format; pp. 1-8.

* cited by examiner

METHOD AND APPARATUS FOR DECODING STEREO LOUDSPEAKER SIGNALS FROM A HIGHER-ORDER AMBISONICS AUDIO SIGNAL

CROSS REFERENCE TO RELATED APPLICATIONS

This application is a continuation of U.S. patent application Ser. No. 17/521,762, filed Nov. 8, 2021, which is a continuation of U.S. patent application Ser. No. 16/538,080, filed Aug. 12, 2019, now U.S. Pat. No. 11,172,317, which is a division of U.S. patent application Ser. No. 15/876,404, filed Jan. 22, 2018, now U.S. Pat. No. 10,433,090 which is division of U.S. patent application Ser. No. 15/479,108, filed Apr. 4, 2017, now U.S. Pat. No. 9,913,062, which is continuation of Ser. No. 14/386,784, filed Sep. 19, 2014, now U.S. Pat. No. 9,666,195, which U.S. National Stage Entry of PCT/EP2013/055792, filed Mar. 20, 2013, which claims priority to European Patent Application No. 12305356.3, filed Mar. 28, 2012, each of which is incorporated by reference in its entirety.

TECHNICAL FIELD

The invention relates to a method and to an apparatus for decoding stereo loudspeaker signals from a higher-order Ambisonics audio signal using panning functions for sampling points on a circle.

BACKGROUND

Decoding of Ambisonics representations for a stereo loudspeaker or headphone setup is known for first-order Ambisonics, e.g. from equation (10) in J. S. Bamford, J. Vender-kooy, "Ambisonic sound for us", Audio Engineering Society Preprints, Convention paper 4138 presented at the 99th Convention, October 1995, New York, and from Xiph Wiki-Ambisonics http://wiki.xiph.org/index.php/Ambisonics#Default_channel_conversions_from_B-Format. These approaches are based on Blumlein stereo as disclosed in GB patent 394325.

Another approach uses mode-matching: M. A. Poletti, "Three-Dimensional Surround Sound Systems Based on Spherical Harmonics", J. Audio Eng. Soc., vol. 53(11), pp. 1004-1025 November 2005.

INVENTION

Such first-order Ambisonics approaches have either high negative side lobes as with Ambisonics decoders based on Blumlein stereo (GB 394325) with virtual microphones having figure-of-eight patterns (cf. section 3.3.4.1 in S. Weinzierl, "Handbuch der Audiotechnik", Springer, Berlin, 2008), or a poor localisation in the frontal direction. With negative side lobes, for instance, sound objects from the back right direction are played back on the left stereo loudspeaker.

A problem to be solved by the invention is to provide an Ambisonics signal decoding with improved stereo signal output.

This invention describes the processing for stereo decoders for higher-order Ambisonics HOA audio signals. The desired panning functions can be derived from a panning law for placement of virtual sources between the loudspeakers. For each loudspeaker, a desired panning function for all possible input directions is defined. The Ambisonics decoding matrix is computed similar to the corresponding description in J. M. Batke, F. Keiler, "Using VBAP-derived panning functions for 3D Ambisonics decoding", Proc. of the 2nd International Symposium on Ambisonics and Spherical Acoustics, May 6-7, 2010, Paris, France, URL http://ambisonics10.ircam.fr/drupal/files/proceedings/presentations/O14_47.pdf, and WO 2011/117399 A1. The panning functions are approximated by circular harmonic functions, and with increasing Ambisonics order the desired panning functions are matched with decreasing error. In particular, for the frontal region in-between the loudspeakers, a panning law like the tangent law or vector base amplitude panning (VBAP) can be used. For the directions to the back beyond the loudspeaker positions, panning functions with a slight attenuation of sounds from these directions are used.

A special case is the use of one half of a cardioid pattern pointing to the loudspeaker direction for the back directions.

In the invention, the higher spatial resolution of higher order Ambisonics is exploited especially in the frontal region and the attenuation of negative side lobes in the back directions increases with increasing Ambisonics order.

The invention can also be used for loudspeaker setups with more than two loudspeakers that are placed on a half circle or on a segment of a circle smaller than a half circle.

Also, it facilitates more artistic downmixes to stereo where some spatial regions receive more attenuation. This is beneficial for creating an improved direct-sound-to-diffuse-sound ratio enabling a better intelligibility of dialogs.

A stereo decoder according to the invention meets some important properties: good localisation in the frontal direction between the loudspeakers, only small negative side lobes in the resulting panning functions, and a slight attenuation of back directions. Also, it enables attenuation or masking of spatial regions which otherwise could be perceived as disturbing or distracting when listening to the two-channel version.

In comparison to WO 2011/117399 A1, the desired panning function is defined circle segment-wise, and in the frontal region in-between the loudspeaker positions a well-known panning processing (e.g. VBAP or tangent law) can be used while the rear directions can be slightly attenuated. Such properties are not feasible when using first-order Ambisonics decoders.

In principle, the inventive method is suited for decoding stereo loudspeaker signals l(t) from a higher-order Ambisonics audio signal a(t), said method including the steps:

- calculating, from azimuth angle values of left and right loudspeakers and from the number S of virtual sampling points on a circle, a matrix G containing desired panning functions for all virtual sampling points, wherein $$G = \begin{bmatrix} g_L(\phi_1) & \dots & g_L(\phi_S) \\ g_R(\phi_1) & \dots & g_R(\phi_S) \end{bmatrix}$$

and the $g_L(\phi)$ and $g_R(\phi)$ elements are the panning functions for the S different sampling points;

- determining the order N of said Ambisonics audio signal a(t);
- calculating from said number S and from said order N a mode matrix Ξ and the corresponding pseudo-inverse $\Xi^+$ of said mode matrix Ξ, wherein $\Xi=[y^*(\phi_1), y^*(\phi_2), \dots, y^*(\phi_s)]$ and $y^*(\phi)=[Y_{-N}^*(\phi), \dots, Y_{-N}^*(\phi), \dots, Y_{-N}^*(\phi)]^T$ is the complex conjugation of the circular harmonics vector $y(\phi)=[Y_{-N}(\phi), \dots,$ $Y_0(\phi), \ldots, Y_N(\phi)]^T$ of said Ambisonics audio signal a(t) and $Y_m(\phi)$ are the circular harmonic functions;

calculating from said matrices G and $\Xi^+$ a decoding matrix $D=G\Xi^+$;

calculating the loudspeaker signals $l(t)=Da(t)$.

In principle, the inventive method is suited for determining a decoding matrix D that can be used for decoding stereo loudspeaker signals $l(t)=Da(t)$ from a 2-D higher-order Ambisonics audio signal a(t), said method including the steps:

receiving the order N of said Ambisonics audio signal a(t);

calculating, from desired azimuth angle values $(\phi_L, \phi_R)$ of left and right loudspeakers and from the number S of virtual sampling points on a circle, a matrix G containing desired panning functions for all virtual sampling points, wherein $$G = \begin{bmatrix} g_L(\phi_1) & \ldots & g_L(\phi_S) \\ g_R(\phi_1) & \ldots & g_R(\phi_S) \end{bmatrix}$$

and the $g_L(\phi)$ and $g_R(\phi)$ elements are the panning functions for the S different sampling points;

calculating from said number S and from said order N a mode matrix $\Xi$ and the corresponding pseudo-inverse $\Xi^+$ of said mode matrix $\Xi$, wherein $\Xi=[y^*(\phi_1), y^*(\phi_2), \ldots, y^*(\phi_s)]$ and $y^*(\phi)=[Y_{-N}^*(\phi), \ldots, Y_0^*(\phi), \ldots, Y_N^*(\phi)]^T$ is the complex conjugation of the circular harmonics vector $y(\phi)=[Y_{-N}(\phi), \ldots, Y_0(\phi), \ldots, Y_N(\phi)]^T$ of said Ambisonics audio signal a(t) and $Y_m(\phi)$ are the circular harmonic functions;

calculating from said matrices G and $\Xi^+$ a decoding matrix $D=G\Xi^+$.

In principle, the inventive apparatus is suited for decoding stereo loudspeaker signals l(t) from a higher-order Ambisonics audio signal a(t), said apparatus including:

means being adapted for calculating, from azimuth angle values of left and right loudspeakers and from the number S of virtual sampling points on a circle, a matrix G containing desired panning functions for all virtual sampling points, wherein $$G = \begin{bmatrix} g_L(\phi_1) & \ldots & g_L(\phi_S) \\ g_R(\phi_1) & \ldots & g_R(\phi_S) \end{bmatrix}$$

and the $g_L(\phi)$ and $g_R(\phi)$ elements are the panning functions for the S different sampling points;

means being adapted for determining the order N of said Ambisonics audio signal a(t);

means being adapted for calculating from said number S and from said order N a mode matrix $\Xi$ and the corresponding pseudo-inverse $\Xi^+$ of said mode matrix $\Xi$, wherein $\Xi=[y^*(\phi_1), y^*(\phi_2), \ldots, y^*(\phi_s)]$ and $y^*(\phi)=[Y_{-N}^*(\phi), \ldots, Y_0^*(\phi), \ldots, Y_N^*(\phi)]^T$ is the complex conjugation of the circular harmonics vector $y(\phi)=[Y_{-N}(\phi), \ldots, Y_0(\phi), \ldots, Y_N(\phi)]^T$ of said Ambisonics audio signal a(t) and $Y_m(\phi)$ are the circular harmonic functions;

means being adapted for calculating from said matrices G and $\Xi^+$ a decoding matrix $D=G\Xi^+$;

means being adapted for calculating the loudspeaker signals $l(t)=Da(t)$.

In one example, the present invention is directed to a method for determining a decoding matrix D for decoding stereo loudspeaker signals from a higher-order Ambisonics audio signal, said method comprising:

determining the order N of the Ambisonics audio signal;

determining based on azimuth angle values of loudspeakers and a number S of virtual sampling points on a sphere, a matrix G containing desired panning function values for all virtual sampling points;

determining a matrix $\Xi^+$ based on the number S and an order N of the Ambisonics audio signal;

determining from said matrices G and $\Xi^+$ a decoding matrix D.

In one example, the present invention is directed to an apparatus for determining a decoding matrix D for decoding stereo loudspeaker signals from a higher-order Ambisonics audio signal, said apparatus comprising:

means for determining the order N of the Ambisonics audio signal;

means for determining based on azimuth angle values of loudspeakers and a number S of virtual sampling points on a sphere, a matrix G containing desired panning function values for all virtual sampling points;

means for determining a matrix $\Xi^+$ based on the number S and the order N;

means for determining from said matrices G and $\Xi^+$ a decoding matrix D.

Advantageous additional embodiments of the invention are disclosed in the respective dependent claims.

DRAWINGS

Exemplary embodiments of the invention are described with reference to the accompanying drawings.

EXEMPLARY EMBODIMENTS

Figure 1:
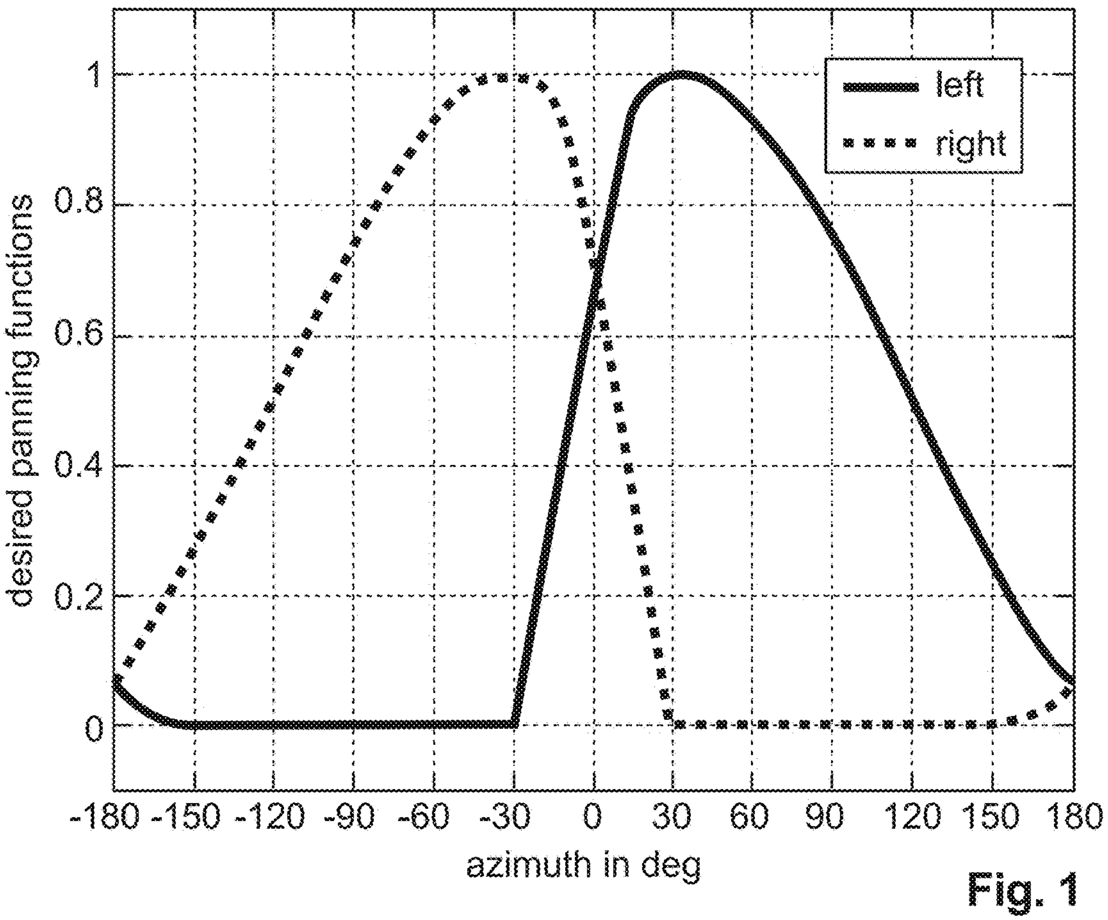
FIG. 1 illustrate desired panning functions, loudspeaker positions $\phi_L=30°$, $\phi_R=-30°$.

In a first step in the decoding processing, the positions of the loudspeakers have to be defined. The loudspeakers are assumed to have the same distance from the listening position, whereby the loudspeaker positions are defined by their azimuth angles. The azimuth is denoted by $\phi$ and is measured counter-clockwise. The azimuth angles of the left and right loudspeaker are $\phi_L$ and $\phi_R$, and in a symmetric setup $\phi_R=-\phi_L$. A typical value is $\phi_L=30°$. In the following description, all angle values can be interpreted with an offset of integer multiples of $2\pi$(rad) or 360°.

The virtual sampling points on a circle are to be defined. These are the virtual source directions used in the Ambisonics decoding processing, and for these directions the desired panning function values for e.g. two real loudspeaker positions are defined. The number of virtual sampling points is denoted by S, and the corresponding directions are equally distributed around the circle, leading to $$\phi_s = 2\pi\frac{s}{S},\ s = 1, \ldots, S. \quad (1)$$

S should be greater than 2N+1, where N denotes the Ambisonics order. Experiments show that an advantageous value is S=8N.

The desired panning functions $g_L(\phi)$ and $g_R(\phi)$ for the left and right loudspeakers have to be defined. In contrast to the approach from WO 2011/117399 A1 and the above-mentioned Batke/Keiler article, the panning functions are defined for multiple segments where for the segments different panning functions are used. For example, for the desired panning functions three segments are used:

a) For the frontal direction between the two loudspeakers a well-known panning law is used, e.g. tangent law or, equivalently, vector base amplitude panning (VBAP) as described in V. Pulkki, "Virtual sound source positioning using vector base amplitude panning", J. Audio Eng. Society, 45(6), pp. 456-466, June 1997.

b) For directions beyond the loudspeaker circle section positions a slight attenuation for the back directions is defined, whereby this part of the panning function is approaching the value of zero at an angle approximately opposite the loudspeaker position.

c) The remaining part of the desired panning functions is set to zero in order to avoid playback of sounds from the right on the left loudspeaker and sounds from the left on the right loudspeaker.

The points or angle values where the desired panning functions are reaching zero are defined by $\phi_{L,0}$ for the left and $\phi_{R,0}$ for the right loudspeaker. The desired panning functions for the left and right loudspeakers can be expressed as:

$$g_L(\phi) = \begin{cases} g_{L,1}(\phi) & , \phi_R < \phi < \phi_L \\ g_{L,2}(\phi) & , \phi_L < \phi < \phi_{L,0} \\ 0 & , \phi_{L,0} < \phi < \phi_R \end{cases} \quad (2)$$

$$g_R(\phi) = \begin{cases} g_{R,1}(\phi) & , \phi_R < \phi < \phi_L \\ g_{R,2}(\phi) & , \phi_{R,0} < \phi < \phi_R \\ 0 & , \phi_L < \phi < \phi_{R,0} \end{cases}. \quad (3)$$

The panning functions $g_{L,1}(\phi)$ and $g_{R,1}(\phi)$ define the panning law between the loudspeaker positions, whereas the panning functions $g_{L,2}(\phi)$ and $g_{R,2}(\phi)$ typically define the attenuation for backward directions. At the intersection points the following properties should be satisfied:

$$g_{L,2}(\phi_L) = g_{L,1}(\phi_L) \quad (4)$$

$$g_{L,2}(\phi_{L,0}) = 0 \quad (5)$$

$$g_{R,2}(\phi_R) = g_{R,1}(\phi_R) \quad (6)$$

$$g_{R,2}(\phi_{R,0}) = 0. \quad (7)$$

The desired panning functions are sampled at the virtual sampling points. A matrix containing the desired panning function values for all virtual sampling points is defined by:

$$G = \begin{bmatrix} g_L(\phi_1) & \ldots & g_L(\phi_S) \\ g_R(\phi_1) & \ldots & g_R(\phi_S) \end{bmatrix} \quad (8)$$

The real or complex valued Ambisonics circular harmonic functions are $Y_m(\phi)$ with m=−N, . . . , N where N is the Ambisonics order as mentioned above. The circular harmonics are represented by the azimuth-dependent part of the spherical harmonics, cf. Earl G. Williams, "Fourier Acoustics", vol. 93 of Applied Mathematical Sciences, Academic Press, 1999.

With the real-valued circular harmonics $$S_m(\phi) = \tilde{N}_m \begin{cases} \cos(m\phi) & , m \geq 0 \\ \sin(|m|\phi) & , m < 0 \end{cases} \quad (9)$$

the circular harmonic functions are typically defined by $$Y_m(\phi) = \begin{cases} N_m e^{im\phi} & , \text{complex-value} \\ S_m(\phi) & , \text{real-valued} \end{cases}, \quad (10)$$

wherein $\tilde{N}_m$ and $N_m$ are scaling factors depending on the used normalisation scheme.

The circular harmonics are combined in a vector $$y(\phi) = [Y_{-N}(\phi), \ldots, Y_0(\phi), \ldots, Y_N(\phi)]^T. \quad (11)$$

Complex conjugation, denoted by $(\cdot)^*$, yields $$y^*(\phi) = [Y_{-N}^*(\phi), \ldots, Y_0^*(\phi), \ldots, Y_N^*(\phi)]^T. \quad (12)$$

The mode matrix for the virtual sampling points is defined by $$\Xi = [y^*(\phi_1), y^*(\phi_2), \ldots, y^*(\phi_S)]. \quad (13)$$

The resulting 2-D decoding matrix is computed by $$D = G\Xi^+, \quad (14)$$

with $\Xi^+$ being the pseudo-inverse of matrix $\Xi$. For equally distributed virtual sampling points as given in equation (1), the pseudo-inverse can be replaced by a scaled version of $\Xi^H$, which is the adjoint (transposed and complex conjugate) of $\Xi$. In this case the decoding matrix is $$D = \alpha G\Xi^H, \quad (15)$$

wherein the scaling factor $\alpha$ depends on the normalisation scheme of the circular harmonics and on the number of design directions S.

Vector $l(t)$ representing the loudspeaker sample signals for time instance t is calculated by $$l(t) = Da(t). \quad (16)$$

When using 3-dimensional higher-order Ambisonics signals a(t) as input signals, an appropriate conversion to the 2-dimensional space is applied, resulting in converted Ambisonics coefficients a'(t). In this case equation (16) is changed to l(t)=Da'(t).

It is also possible to define a matrix $D_{3D}$, which already includes that 3D/2D conversion and is directly applied to the 3D Ambisonics signals a(t).

In the following, an example for panning functions for a stereo loudspeaker setup is described. In-between the loudspeaker positions, panning functions $g_{L,1}(\phi)$ and $g_{R,1}(\phi)$ from eq. (2) and eq. (3) and panning gains according to VBAP are used. These panning functions are continued by one half of a cardioid pattern having its maximum value at the loudspeaker position. The angles $\phi_{L,0}$ and $\phi_{R,0}$ are defined so as to have positions opposite to the loudspeaker positions:

$$\phi_{L,0} = \phi_L + \pi \tag{17}$$

$$\phi_{R,0} = \phi_R + \pi. \tag{18}$$

Normalised panning gains are satisfying $g_{L,1}(\phi_L)=1$ and $g_{R,1}(\phi_R)=1$. The cardioid patterns pointing towards $\phi_L$ and $\phi_R$ are defined by:

$$g_{L,2}(\phi) = \frac{1}{2}(1 + \cos(\phi - \phi_L)) \tag{19}$$

$$g_{R,2}(\phi) = \frac{1}{2}(1 + \cos(\phi - \phi_R)). \tag{20}$$

For the evaluation of the decoding, the resulting panning functions for arbitrary input directions can be obtained by $$W = D\gamma \tag{21}$$

where Y is the mode matrix of the considered input directions. W is a matrix that contains the panning weights for the used input directions and the used loudspeaker positions when applying the Ambisonics decoding process.

Figure 2:
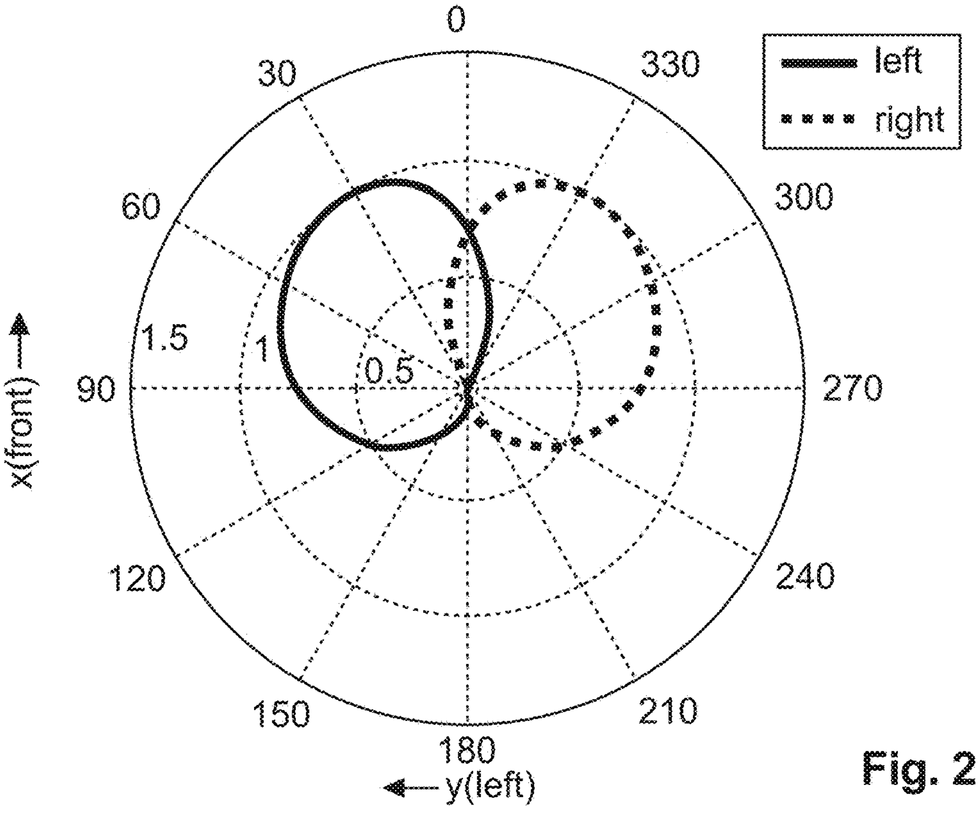
FIG. 2 illustrate desired panning functions as polar diagram, loudspeaker positions $\phi_L=30°$, $\phi_R=-30°$.

FIG. 1 and FIG. 2 depict the gain of the desired (i.e. theoretical or perfect) panning functions vs. a linear angle scale as well as in polar diagram format, respectively.

Figure 3:
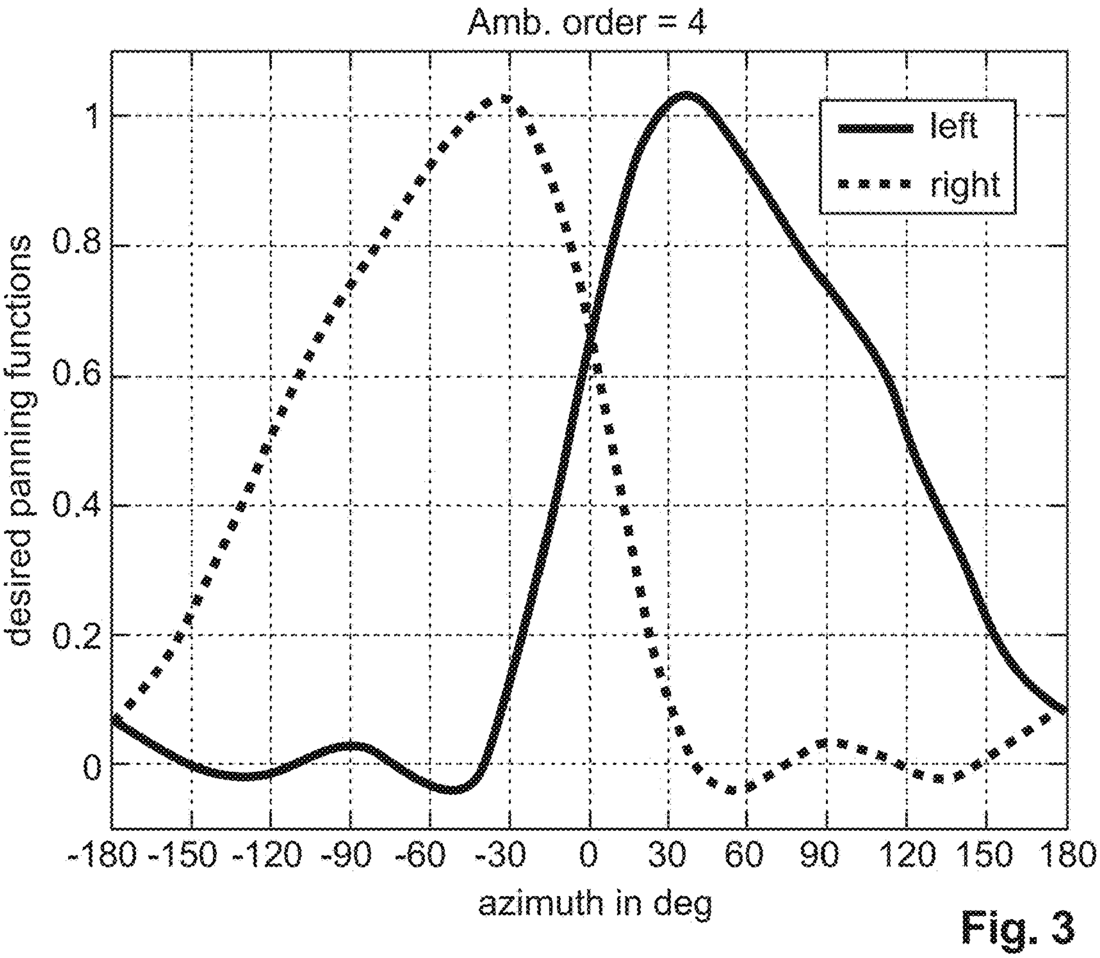
FIG. 3 illustrate resulting panning function for N=4, loudspeaker positions $\phi_L=30°$, $\phi_R=-30°$.
Figure 4:
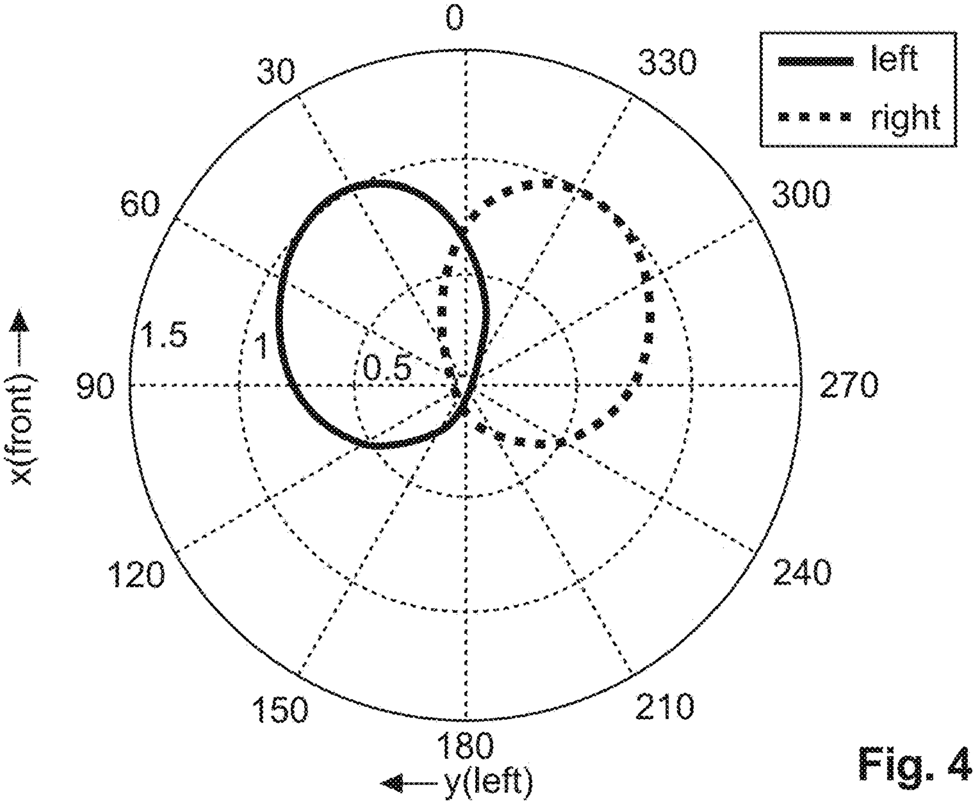
FIG. 4 illustrate resulting panning functions for N=4 as polar diagram, loudspeaker positions $\phi_L=30°$, $\phi_R=-30°$.

The resulting panning weights for Ambisonics decoding are computed using eq. (21) for the used input directions. FIG. 3 and FIG. 4 show, calculated for an Ambisonics order N=4, the corresponding resulting panning functions vs. a linear angle scale as well as in polar diagram format, respectively.

The comparison of FIGS. 3/4 with FIGS. 1/2 shows that the desired panning functions are matched well and that the resulting negative side lobes are very small.

In the following, an example for a 3D to 2D conversion is provided for complex-valued spherical and circular harmonics (for real-valued basis functions it can be carried out in a similar way). The spherical harmonics for 3D Ambisonics are:

$$\hat{Y}_n^m(\theta, \varphi) = M_{n,m} P_n^m(\cos(\theta)) e^{im\varphi}, \tag{21}$$

wherein n=0, . . . , N is the order index, m=−n, . . . , n is the degree index, $M_{n,m}$ is the normalisation factor dependent on the normalisation scheme, θ is the inclination angle and $P_n^m$(19) are the associated Legendre functions. With given Ambisonics coefficients $\hat{A}_n^m$ for the 3D case, the 2D coefficients are calculated by $$A_m = \alpha_m \hat{A}_{|m|}^m,\ m = -N, \ldots , N \tag{22}$$

with the scaling factors $$\alpha_m = \frac{N_m}{M_{|m|,m} P_{|m|}^m(0)},\ m = -N, \ldots , N. \tag{23}$$

Figure 5:
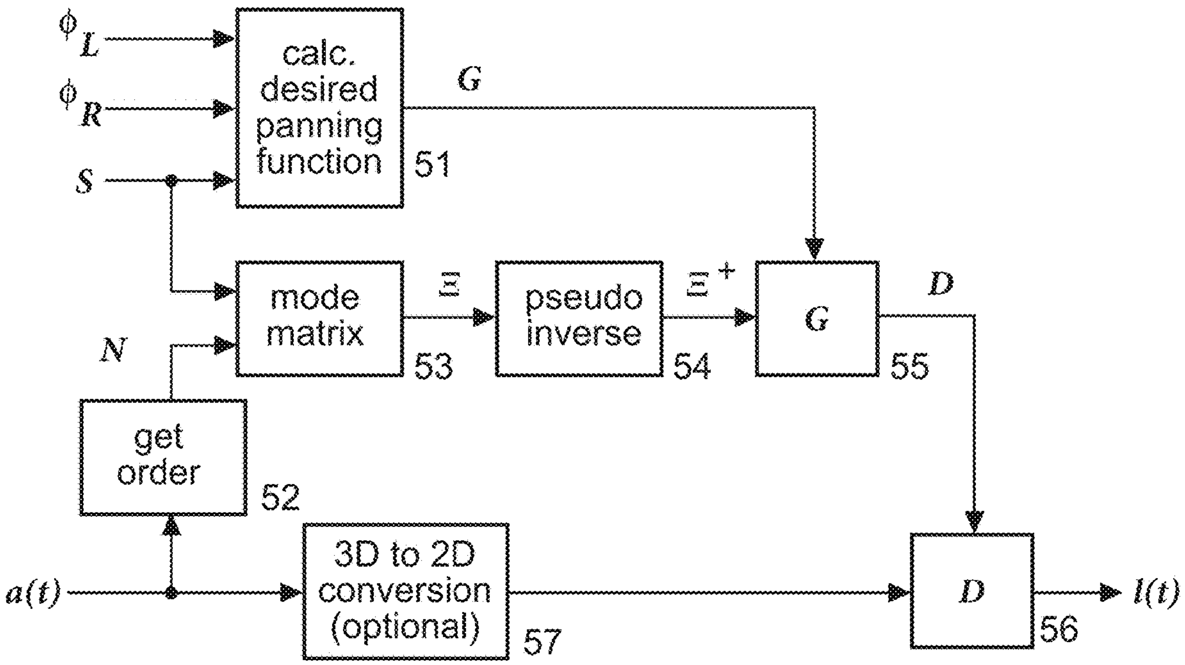
FIG. 5 illustrates block diagram of the processing according to the invention.

In FIG. 5, step or stage 51 for calculating the desired panning function receives the values of the azimuth angles $\phi_L$ and $\phi_R$ of the left and right loudspeakers as well as the number S of virtual sampling points, and calculates there from—as described above—matrix G containing the desired panning function values for all virtual sampling points. From Ambisonics signal a(t) the order N is derived in step/stage 52. From S and N the mode matrix Ξ is calculated in step/stage 53 based on equations 11 to 13.

Step or stage 54 computes the pseudo-inverse $\Xi^+$ of matrix Ξ. From matrices G and $\Xi^+$ the decoding matrix D is calculated in step/stage 55 according to equation 15. In step/stage 56, the loudspeaker signals l(t) are calculated from Ambisonics signal a(t) using decoding matrix D. In case the Ambisonics input signal a(t) is a three-dimensional spatial signal, a 3D-to-2D conversion can be carried out in step or stage 57 and step/stage 56 receives the 2D Ambisonics signal a'(t).

The invention claimed is:

1. A method for decoding a Higher-Order Ambisonics (HOA) audio signal, the method comprising:
- receiving the HOA audio signal;
- determining a matrix G of panning function values, wherein the matrix G contains, for each of a number S of virtual sampling points on a sphere, gain vectors $g_1 \ldots g_s$, wherein at least a first panning function value for a first virtual sampling point located opposite to a loudspeaker position approaches zero, and at least a second panning function value for a second source located close to the loudspeaker position has a value not approaching zero; determining a decoding matrix D based on the matrix G;
- applying a 3D to 2D conversion based on the matrix D in order to determine a 2D rendering matrix; and
- rendering, by at least one processor, the HOA audio signal to stereo loudspeaker signals based on the 2D rendering matrix.

2. The method of claim 1, wherein the matrix G has a size L×S, wherein L corresponds to a number of loudspeakers.

3. The method of claim 2, wherein the gain vectors $g_1 \ldots g_s$, are directed to achieve a panned mix in S directions of the L loudspeakers.

4. A non-transitory computer-readable medium having stored thereon instructions, that when executed by one or more processors, cause one or more processors to perform the method of claim 1.

5. An apparatus for decoding a Higher-Order Ambisonics (HOA) audio signal, the apparatus comprising:

a first receiver configured to receive the HOA audio signal;

a first processor for determining a matrix G of panning function values, wherein the matrix G contains, for each of a number S of virtual sampling points on a sphere, gain vectors $g_1 \ldots g_s$, wherein at least a first panning function value for a first virtual sampling point located opposite to a loudspeaker position approaches zero, and at least a second panning function value for a source located close to the loudspeaker position has a value not approaching zero;

a second processor for determining a decoding matrix D based on the matrix G;

a third processor applying a 3D to 2D conversion based on the matrix D in order to determine a 2D rendering matrix; and a renderer for rendering the HOA audio signal to stereo loudspeaker signals based on the 2D rendering matrix.

6. The apparatus of claim 5, wherein the matrix G has a size L×S, wherein L corresponds to a number of loudspeakers.

7. The apparatus of claim 6, wherein the gain vectors $g_1 \ldots g_s$, are directed to achieve a panned mix in S directions of the L loudspeakers.

* * * * *